United States Patent
Nakamura et al.

(10) Patent No.: US 11,753,088 B2
(45) Date of Patent: Sep. 12, 2023

(54) BUMPER SPOILER STRUCTURE

(71) Applicant: HONDA MOTOR CO., LTD., Tokyo (JP)

(72) Inventors: Yuki Nakamura, Wako (JP); Kei Ambo, Wako (JP); Kenichi Ando, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 42 days.

(21) Appl. No.: 17/676,419

(22) Filed: Feb. 21, 2022

(65) Prior Publication Data

US 2022/0289314 A1   Sep. 15, 2022

(30) Foreign Application Priority Data

Mar. 15, 2021  (JP) ................. 2021-041825

(51) Int. Cl.
| | | |
|---|---|---|
| *B62D 35/00* | (2006.01) | |
| *B60R 19/48* | (2006.01) | |
| *B60R 19/02* | (2006.01) | |

(52) U.S. Cl.
CPC .......... *B62D 35/005* (2013.01); *B60R 19/023* (2013.01); *B60R 19/48* (2013.01); *B60R 19/483* (2013.01)

(58) Field of Classification Search
CPC ...... B62D 35/00; B62D 35/005; B62D 35/02; B60R 19/023; B60R 19/38; B60R 19/40; B60R 19/48; B60R 19/483
See application file for complete search history.

(56) References Cited

U.S. PATENT DOCUMENTS

| | | | | |
|---|---|---|---|---|
| 6,394,512 | B1 * | 5/2002 | Schuster | B60R 19/12 293/118 |
| 9,527,535 | B1 * | 12/2016 | Cha | B60R 19/48 |
| 10,981,611 | B2 * | 4/2021 | Matthews | B62D 35/005 |
| 11,180,203 | B2 * | 11/2021 | Klop | B62D 37/02 |
| 2007/0100527 | A1 * | 5/2007 | Rao | B60R 21/0134 701/45 |
| 2015/0166130 | A1 | 6/2015 | Lee et al. | |
| 2022/0289314 | A1 * | 9/2022 | Nakamura | B62D 35/007 |
| 2023/0073908 | A1 * | 3/2023 | Kim | B60Q 1/2661 |

FOREIGN PATENT DOCUMENTS

| | | | | |
|---|---|---|---|---|
| DE | 10324514 | * | 5/2003 | ............ B62D 37/02 |
| DE | 102019103707 | * | 2/2019 | ............ B60R 21/34 |
| GB | 2539984 | * | 9/2015 | ............ B60R 21/34 |

* cited by examiner

*Primary Examiner* — Gregory A Blankenship
(74) *Attorney, Agent, or Firm* — Rankin, Hill & Clark LLP

(57) ABSTRACT

A bumper spoiler structure includes: a bumper panel provided in a bumper of a vehicle; a bumper spoiler capable of advancing and retreating relative to the bumper panel by being moved in an inside-outside direction of the vehicle; a first actuator movable in the inside-outside direction and configured to move the bumper spoiler in the inside-outside direction; a first controller configured to control the first actuator; a second actuator configured to move the bumper spoiler and the first actuator in the inside-outside direction; and a second controller configured to control the second actuator. When at least one of the first actuator and the first controller is lost in a deployed state in which the bumper spoiler protrudes with respect to the bumper panel, the second controller moves the bumper spoiler and the first actuator toward an inner side of the vehicle by using the second actuator.

5 Claims, 5 Drawing Sheets

RETRACTED-DEPLOYED STATE

FAIL-SAFE STATE

BUMPER SPOILER STRUCTURE

CROSS-REFERENCE TO RELATED APPLICATION

This application claims the benefit of foreign priority to Japanese Patent Application No. 2021-041825, filed on Mar. 15, 2021, which is incorporated by reference in its entirety.

TECHNICAL FIELD

The present invention relates to a bumper spoiler structure.

BACKGROUND

There has been conventionally known an apparatus that functions as a rear bumper when a vehicle is in a stopped or low-speed traveling state and functions as a diffuser when the vehicle is in a high-speed traveling state by moving the rear bumper rearward with a spoiler rod in traveling (for example, specification of US2015/0166130A). This can achieve an optimal aerodynamic performance depending on vehicle speed.

In a conventional bumper spoiler structure as described above, when a failure or the like occurs in a control mechanism that moves a spoiler, the rear bumper is not present at a desired position and a function as a bumper decreases in some cases. Accordingly, there is a room for further improvements.

An object of the present invention is to provide a bumper spoiler structure that can exhibit a desired collision performance even when a failure or the like occurs in a control mechanism of a bumper spoiler.

SUMMARY

According to one aspect of the present invention, a bumper spoiler structure includes: a bumper panel provided in a bumper of a vehicle; a bumper spoiler capable of advancing and retreating relative to the bumper panel by being moved in an inside-outside direction of the vehicle; a first actuator movable in the inside-outside direction of the vehicle and configured to move the bumper spoiler in the inside-outside direction of the vehicle; a first controller configured to control the first actuator; a second actuator configured to move the bumper spoiler and the first actuator in the inside-outside direction of the vehicle; and a second controller configured to control the second actuator. When at least one of the first actuator and the first controller is lost in a deployed state in which the bumper spoiler protrudes with respect to the bumper panel, the second controller moves the bumper spoiler and the first actuator toward an inner side of the vehicle by using the second actuator.

BRIEF DESCRIPTION OF THE DRAWINGS

The drawings described herein are for illustration purposes only and are not intended to limit the scope of the present invention in any way.

DETAILED DESCRIPTION

Figure 1:
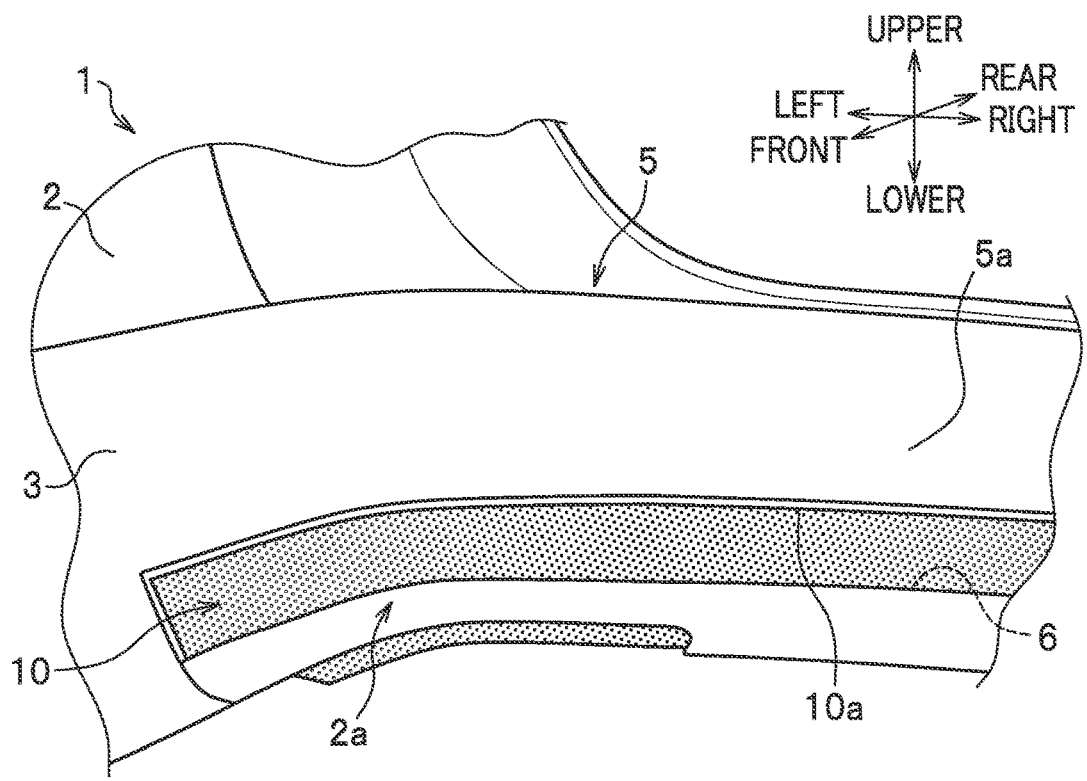
FIG. 1 is a perspective view, as viewed from a rear left side of a vehicle, illustrating a bumper spoiler structure according to one embodiment of the present invention.

One embodiment of the present invention is described below with reference to the drawings as appropriate. The same components are denoted by the same reference numerals and duplicated description is omitted. Directions such as front, rear, left, right, upper, and lower are described basically, unless otherwise noted, based on corresponding directions as viewed from the driver. A "vehicle width direction" is synonymous with a "left-right direction".

A configuration of a bumper spoiler structure according to this embodiment is described.

As illustrated in FIG. 1, a rear bumper 3 is provided in a rear portion 2 of a vehicle 1. The rear bumper 3 includes a bumper beam 4 (see FIG. 3) as a strength member, a bumper panel 5 that forms a design surface, and a movable bumper spoiler 10.

The bumper beam 4 is a member with a hollow structure and is arranged at the inner side of the bumper panel 5 to extend in the vehicle width direction.

The bumper panel 5 is made of a resin material and has a vertical cross section that is open toward the front side of the vehicle to provide a recess shape.

A support member 8 as a vehicle member is arranged in front of the bumper beam 4 and the bumper panel 5 with a predetermined space 7 provided between the support member 8 and the set of the bumper beam 4 and the bumper panel 5. The support member 8 is, for example, a rear floor panel. A spoiler drive unit 11 and a fail-safe unit 21 to be described later are arranged in the space 7.

A spoiler opening 6 is formed at a lower rear end of the bumper panel 5. The spoiler opening 6 is formed to have a substantially slotted hole shape whose longitudinal direction extends in the vehicle width direction. The spoiler opening 6 causes the space 7 and a space outside the vehicle to communicate with each other in a front-rear direction of the vehicle (same as an inside-outside direction in the rear bumper 3 of the vehicle 1 (also referred to as a front-rear direction hereinafter)).

The spoiler opening 6 has such a size that at least part of the bumper spoiler 10 can be inserted in the inside-outside direction. The bumper spoiler 10 is thereby configured to be capable of moving in the inside-outside direction and advancing and retreating relative to an outer surface 5*a* of the bumper panel 5 without interfering with a peripheral edge of the spoiler opening 6.

In this embodiment, a part of the bumper spoiler 10 provided in a left portion of the spoiler opening 6 is illustrated for description. A bumper spoiler 10 is formed to be left-right symmetric and left and right portions thereof have similar shapes. In this case, the left portion of the bumper spoiler 10 is illustrated for description.

Figure 2:
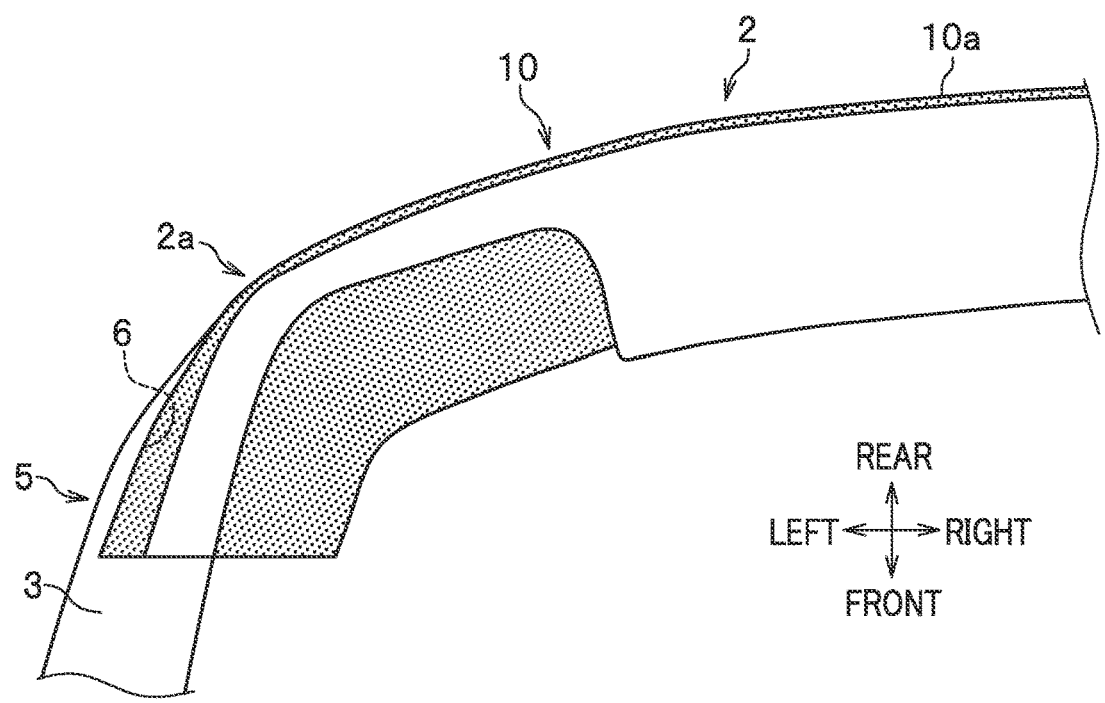
FIG. 2 is a plan view, as viewed from bottom, illustrating the configuration of the bumper spoiler structure at a rear left portion of the vehicle.

FIG. 2 is a plan view, as viewed from bottom, illustrating a left corner portion 2a of the rear portion 2. An end edge of the bumper spoiler 10 in the vehicle width direction is curved to extend along an arc shape of the bumper panel 5. A center portion of the bumper spoiler 10 in the vehicle width direction has substantially a mountain shape protruding toward the rear side of the vehicle.

Figure 3:
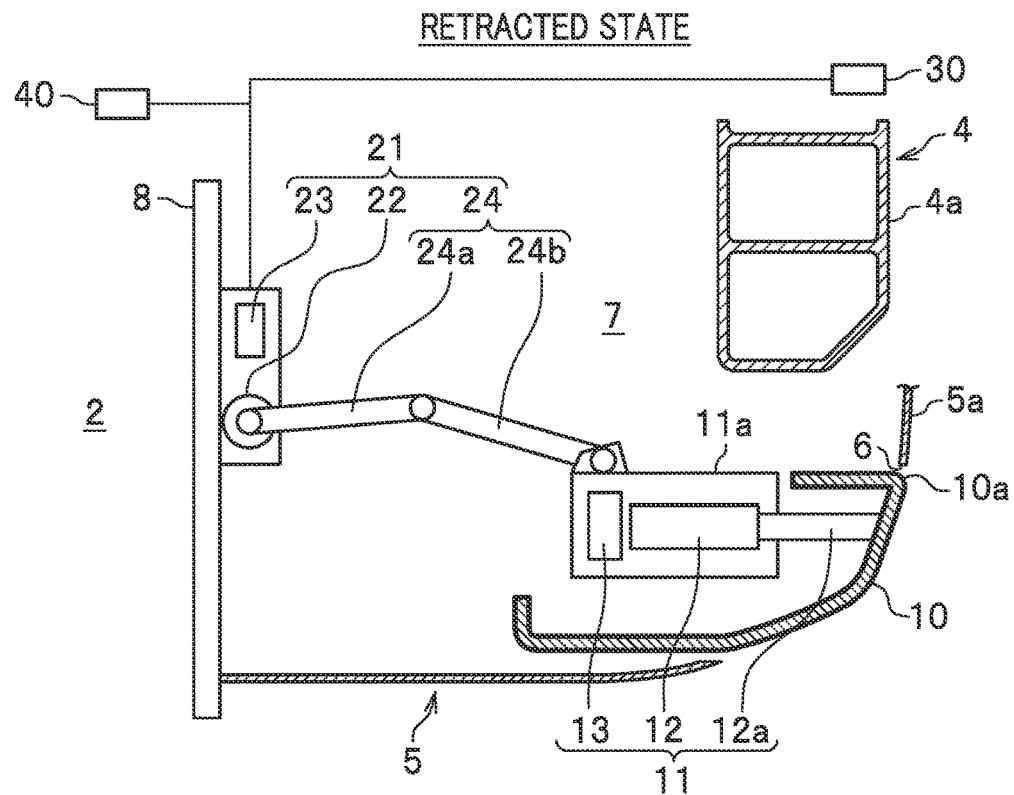
FIG. 3 is a schematic cross-sectional view of the bumper spoiler structure explaining a situation where a bumper spoiler is in a retracted state.

As illustrated in FIG. 3, the spoiler drive unit 11 is provided inside the recess-shaped bumper spoiler 10 arranged in the space 7.

The spoiler drive unit 11 is provided to be movable in the inside-outside direction in the space 7 and moves the bumper spoiler 10 in the inside-outside direction.

Accordingly, the spoiler drive unit 11 includes a first actuator 12 that is connected to the bumper spoiler 10 and a first controller 13 that controls the first actuator 12, in a substantially box shaped case 11a. The spoiler drive unit 11 can slide in the front-rear direction along a guide member (not shown) such as a rail.

The first actuator 12 includes a spoiler rod 12a that moves in the inside-outside direction under control from the first controller 13. A distal end of the spoiler rod 12a is connected to an inner surface of the bumper spoiler 10. Specifically, the first actuator 12 drives the spoiler rod 12a to extend and contract the spoiler rod 12a depending on control from the first controller 13. The bumper spoiler 10 can thereby move in the inside-outside direction of the vehicle and advance from and retreat to the spoiler opening 6 of the bumper panel 5.

For example, in a state where the spoiler rod 12a of the first actuator 12 is contracted as illustrated in FIG. 3, the bumper spoiler 10 is set to a retracted state in which the bumper spoiler 10 is moved and arranged in the space 7 to be substantially flush with the outer surface 5a of the bumper panel 5.

Figure 4:
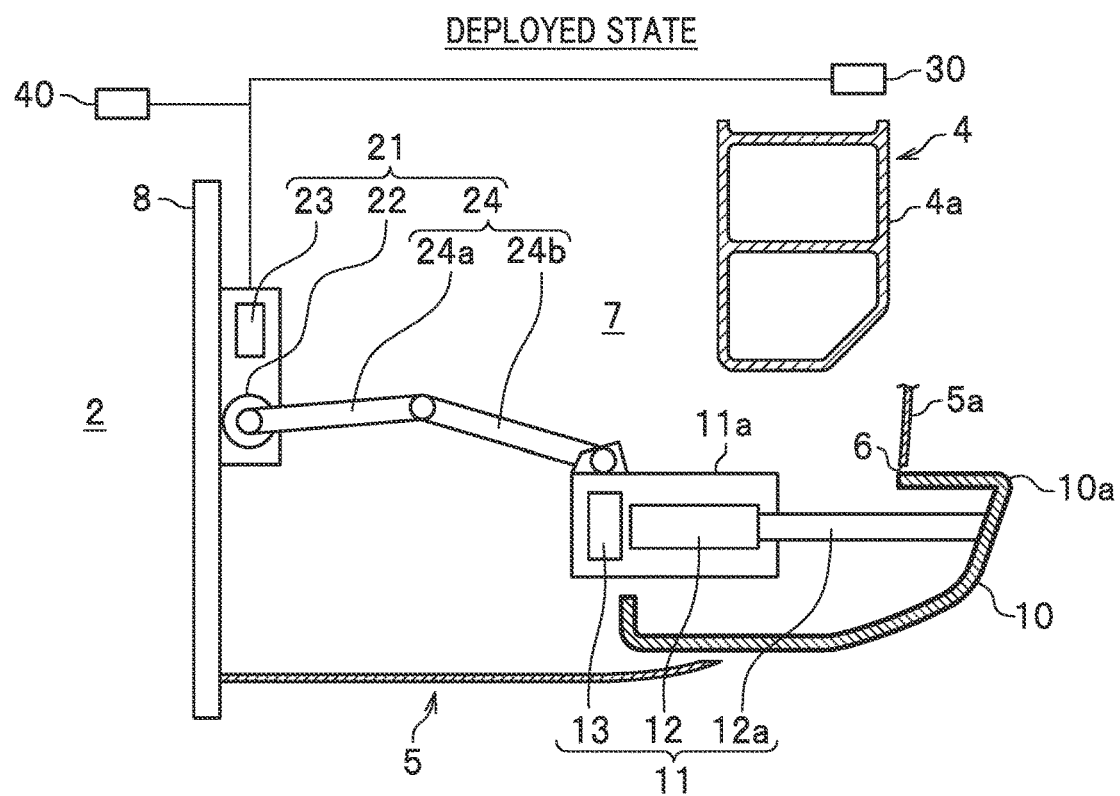
FIG. 4 is a schematic cross-sectional view of the bumper spoiler structure explaining a situation where the bumper spoiler is in a deployed state.

Meanwhile, in a state where the spoiler rod 12a of the first actuator 12 is extended as illustrated in FIG. 4, the bumper spoiler 10 is set to a deployed state in which at least part of the bumper spoiler 10 protrudes toward the rear side of the vehicle beyond the outer surface 5a with respect to the bumper panel 5.

In the retracted state and the deployed state of the bumper spoiler 10, the fail-safe unit 21 to be described later supports the spoiler drive unit 11 and the bumper spoiler 10 at a position away from and behind the support member 8.

The bumper spoiler structure according to this embodiment includes the fail-safe unit 21.

The fail-safe unit 21 includes a second actuator 22, a second controller 23 that controls the second actuator 22, and a drive arm 24 connected to the spoiler drive unit 11. The fail-safe unit 21 is arranged on the support member 8 at a side closer to the space 7. It should be noted that the present invention is not limited to this particular configuration. For example, the first actuator 12 and the first controller 13 may be used as the fail-safe unit. Moreover, the second actuator 22 and the second controller 23 may be used together with the first actuator 12 and the first controller 13.

The second actuator 22 drives the drive arm 24 connected to the spoiler drive unit 11. The drive arm 24 moves the bumper spoiler 10 in the inside-outside direction of the vehicle together with the spoiler drive unit 11 including the first actuator 12 and the first controller 13 provided in the case 11a.

Specifically, the drive arm 24 includes a first link member 24a whose base end portion is connected to a rotation drive shaft of the second actuator 22. Moreover, the drive arm 24 includes a second link member 24b that is linked to a distal end portion of the first link member 24a via a rotation shaft having an axial direction extending in the vehicle width direction.

When a turning shaft of the second actuator 22 turns under control of the second controller 23, the first link member 24a out of the aforementioned link members is turned in the inside-outside direction with the base end portion of the first link member 24a being the turning center and the distal end portion of the first link member 24a swings in the inside-outside direction of the vehicle.

A base end portion of the second link member 24b is turnably connected to the distal end portion of the first link member 24a via a turning shaft. Accordingly, the second link member 24b is extended or folded and a distal end portion of the second link member 24b is moved in the inside-outside direction with the turning operation of the first link member 24a. The case 11a of the spoiler drive unit 11 is pivotally supported on the distal end portion of the second link member 24b.

Accordingly, it is possible to transmit drive force of the second actuator 22 from the drive arm 24 to the case 11a and move the spoiler drive unit 11 in the inside-outside direction of the vehicle together with the bumper spoiler 10.

For example, as illustrated in FIGS. 3 and 4, the first link member 24a is turned toward the rear side of the vehicle under control of the second controller 23. The second link member 24b on which the spoiler drive unit 11 is pivotally supported is thereby linearly extended toward the rear side of the vehicle together with the first link member 24a.

The extension of the links of the drive arm 24 causes the first actuator 12 and the first controller 13 of the spoiler drive unit 11 to move toward the rear side of the vehicle 1. The second controller 23 stops the turn drive of the second actuator 22 in a state where the drive arm 24 is extended.

The spoiler drive unit 11 is supported at a position away from and behind the support member 8 when the drive arm 24 is at the extended position. Then, the spoiler drive unit 11 can move the bumper spoiler 10 from this position to either the retracted state (see FIG. 3) or the deployed state (see FIG. 4) by performing drive control of the first actuator 12.

Figure 5:
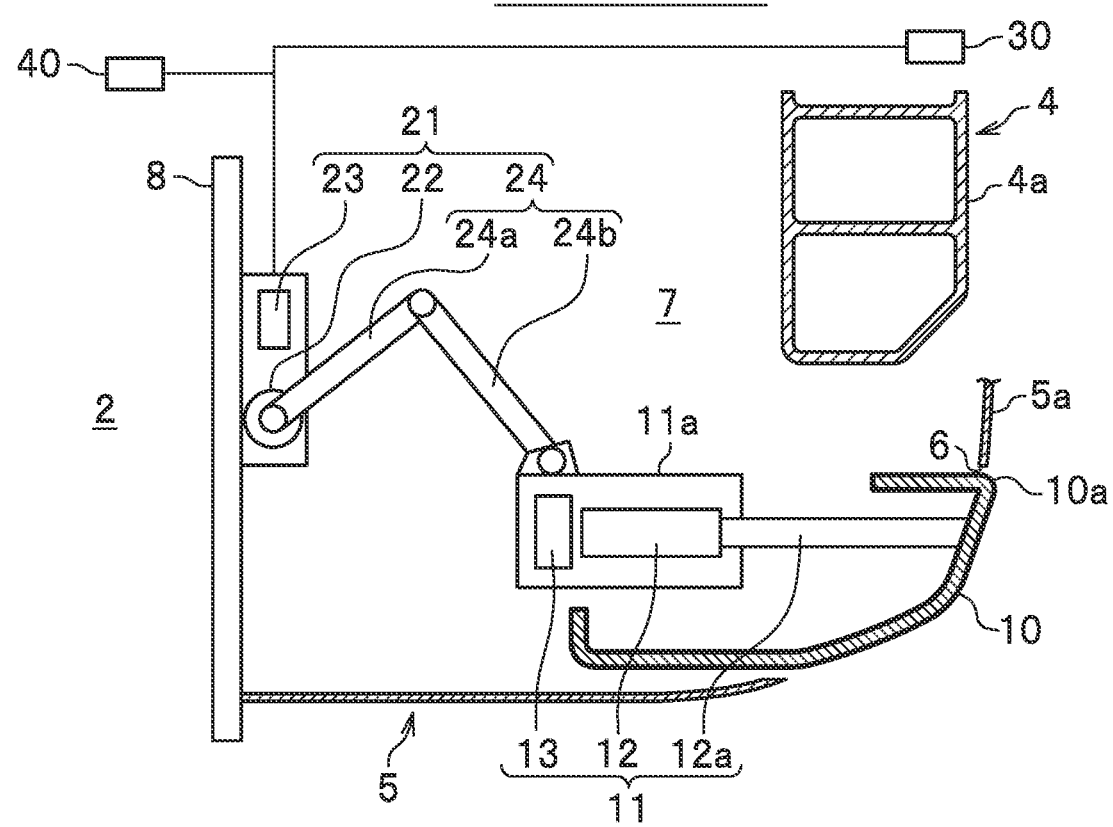
FIG. 5 is a schematic cross-sectional view of the bumper spoiler structure explaining a situation where the bumper spoiler is in a fail-safe state.

First, operation of the fail-safe unit 21 is described with reference to FIGS. 4 and 5, and fail-safe using an elastic member 16 is described later in a modified embodiment to be described later with reference made to FIGS. 7 and 8. As illustrated in FIG. 4, the spoiler drive unit 11 may lose at least one of the first actuator 12 and the first controller 13 in the deployed state of the bumper spoiler 10. In this case, the bumper spoiler 10 remains in the deployed state in which the bumper spoiler 10 protrudes toward the rear side of the vehicle beyond the outer surface 5a with respect to the bumper panel 5, and there is a risk that the bumper cannot exhibit a desired bumper performance.

In such a state, the fail-safe unit 21 drives the second actuator 22 under control from the second controller 23. Then, as illustrated in FIG. 5, the fail-safe unit 21 can move the spoiler drive unit 11 in the inner direction (forward direction) of the vehicle together with the bumper spoiler 10 and retract the bumper spoiler 10 into the space 7 to achieve a fail-safe state.

Specifically, even when the bumper spoiler 10 stops moving in the deployed state due to failure of the spoiler drive unit 11, the second controller 23 can perform the drive control of the second actuator 22 and move the bumper spoiler 10. Accordingly, an outer end 10a of the bumper spoiler 10 can be moved to a position in the retracted state, at which position the outer end 10a of the bumper spoiler 10 is flush with or located inward of an outer end 4a of the bumper beam 4, and allows the bumper to exhibit a desired collision performance.

Moreover, as illustrated in FIG. 3, the rear bumper 3 according to this embodiment includes the bumper beam 4 that extends in the vehicle width direction in front of the bumper panel 5.

The second controller 23 moves the bumper spoiler 10 forward. In this case, the outer end 10a of the bumper spoiler 10 is located frontward of the outer end 4a of the bumper beam 4, in the space 7 disposed in the inner side of the vehicle.

Accordingly, a load applied to the rear side of the vehicle 1 in collision is appropriately inputted to the bumper beam 4. Thus, the rear bumper 3 can exhibit the collision performance desired in designing.

The vehicle 1 includes an obstacle sensor 30 for detecting obstacles. According to this embodiment, as illustrated in FIG. 3, the obstacle sensor 30 is provided above the bumper beam 4 arranged in the rear portion 2 of the vehicle 1. The obstacle sensor 30 is connected to the first controller 13 and the second controller 23. When the obstacle sensor 30 detects an obstacle present behind the vehicle 1, the obstacle sensor 30 determines that there is a risk of collision of the obstacle to the rear bumper 3, and sends an obstacle detection signal to the first controller 13 and the second controller 23 as information on the obstacle.

At least one of the first controller 13 and the second controller 23 performs control of determining whether to move the bumper spoiler 10 forward by the drive of the first actuator 12 or the second actuator 22, based on the information from the obstacle sensor 30. In this embodiment, when an obstacle is detected, first, the spoiler drive unit 11 retracts the bumper spoiler 10. If the spoiler drive unit 11 is lost and is in a non-operational state and the bumper spoiler 10 remains in the deployed state, the fail-safe unit 21 retracts the bumper spoiler 10 into the space 7 to avoid contact with the obstacle.

The vehicle 1 includes a vehicle speed sensor 40. In this embodiment, the vehicle speed sensor 40 provided in advance in the vehicle 1 is used. The vehicle speed sensor 40 is connected to at least one of the first controller 13 and the second controller 23. The vehicle speed sensor 40 sends a vehicle speed signal to the first controller 13 or the second controller 23 as information indicating the traveling speed of the vehicle 1.

When it is determined that the vehicle speed V is equal to or lower than a predetermined threshold V1 based on the information from the vehicle speed sensor 40, the first controller 13 moves the bumper spoiler 10 toward the inner side of the vehicle and retracts the bumper spoiler 10 into the space 7. When it is determined that the vehicle speed V is higher than the predetermined threshold V1, the first controller 13 causes the bumper spoiler 10 to remain in a stopped state to prevent an acute change in aerodynamic performance during traveling.

When the vehicle speed V is higher than the predetermined threshold V1, the second controller 23 causes the bumper spoiler 10 to remain in a stopped state even if the spoiler drive unit 11 is lost and is in the operation stop state and the bumper spoiler 10 remains in the deployed state. This can prevent an acute change in aerodynamic performance during traveling.

It should be noted that the obstacle sensor 30 and the vehicle speed sensor 40 may be connected only to the second controller 23. Any configuration may be employed as long as the obstacle sensor 30 and the vehicle speed sensor 40 are connected to at least one of the first controller 13 and the second controller 23 and the bumper spoiler 10 can be returned to a desired position.

Figure 6:
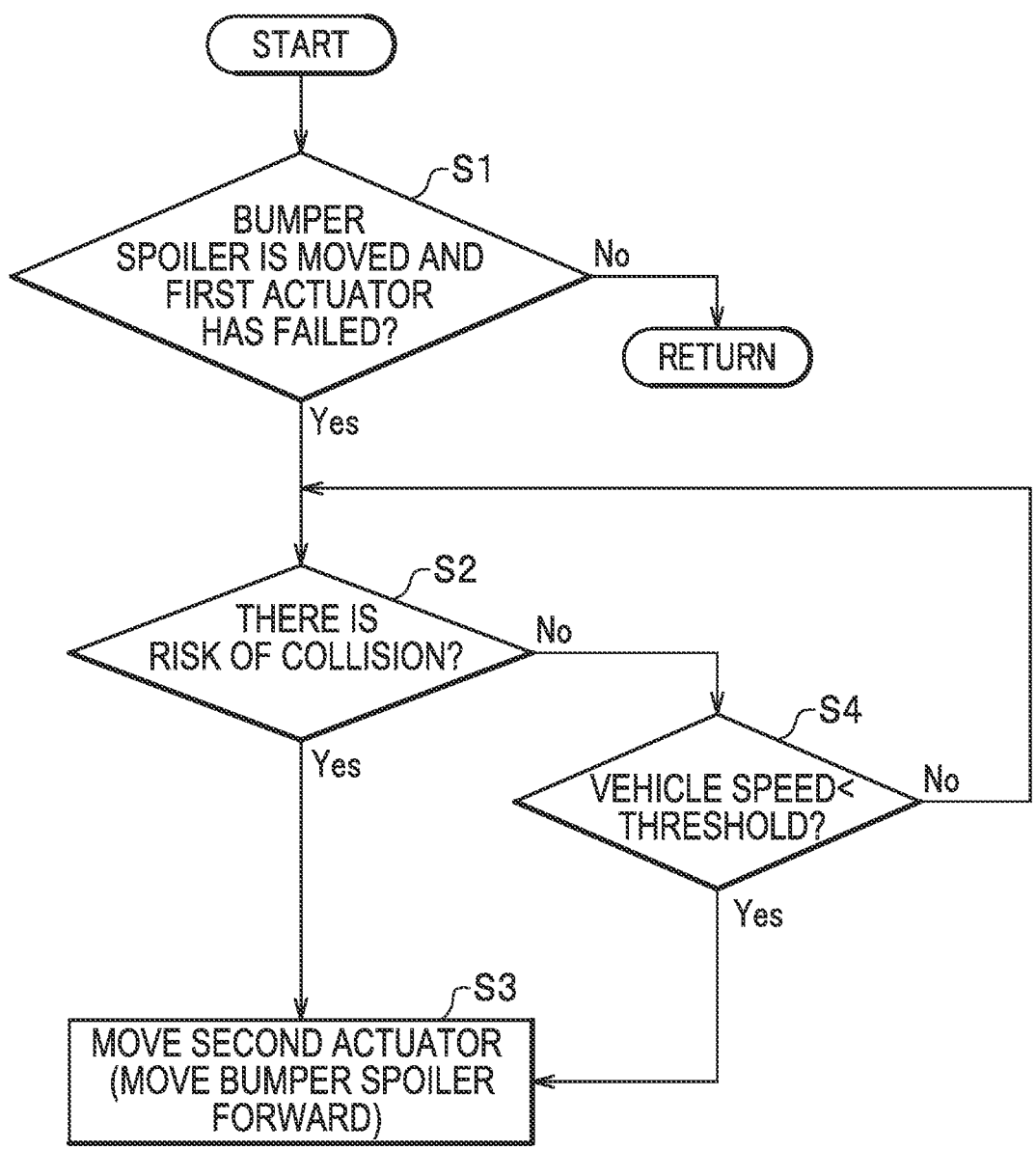
FIG. 6 is a flowchart explaining control of a second actuator in the bumper spoiler structure.

FIG. 6 is a flowchart explaining control of the second actuator in the bumper spoiler structure according to this embodiment.

When the control is started, in step S1, the second controller 23 determines whether the bumper spoiler 10 is being moved and the first actuator 12 is in a state where there is a failure (i.e., failed state).

If the second controller 23 determines that the first actuator 12 is in the failed state (YES in step S1), the processing proceeds to step S2. Meanwhile, when the second controller 23 determines that the first actuator 12 is not in the failed state (NO in step S1), the process of step S1 is repeated (return).

In step S2, the second controller 23 determines whether the vehicle 1 has a risk of collision based on information from the obstacle sensor 30. If the second controller 23 determines that the vehicle 1 has a risk of collision (YES in step S2), the processing proceeds to step S3. In step S3, the second actuator 22 is moved to move the first actuator 12 and the bumper spoiler 10 forward.

Detecting the risk of collision in advance as described above allows the bumper spoiler 10 to be moved forward without fail and allows the bumper to exhibit the desired collision performance.

Meanwhile, when the second controller 23 determines that the vehicle 1 has no risk of collision (NO in step S2), the processing proceeds to step S4.

In step S4, the second controller 23 determines whether the vehicle speed V is lower than the predetermined vehicle speed threshold V1 based on the information on the vehicle speed V from the vehicle speed sensor 40 for detecting the vehicle speed of the vehicle 1.

When the second controller 23 determines that the vehicle speed V is lower than the predetermined vehicle speed threshold V1 in step S4 (vehicle speed V<threshold V1: YES in step S4), the processing proceeds to step S3 and the first actuator 12 and the bumper spoiler 10 are moved forward.

In some cases, the second controller 23 determines that the vehicle speed V is not lower than the predetermined vehicle speed threshold V1 in step S4 (vehicle speed V>threshold V1: NO in step S4). In such a case, an abrupt change in aerodynamic performance during traveling is assumed to occur, and the second controller 23 thus returns the processing to step S2.

It is therefore possible to prevent the bumper spoiler 10 from moving in a state where the vehicle speed V has not fallen to the threshold V1. Accordingly, no abrupt change in aerodynamic performance occurs and strangeness felt by the driver can be reduced.

Figure 7:
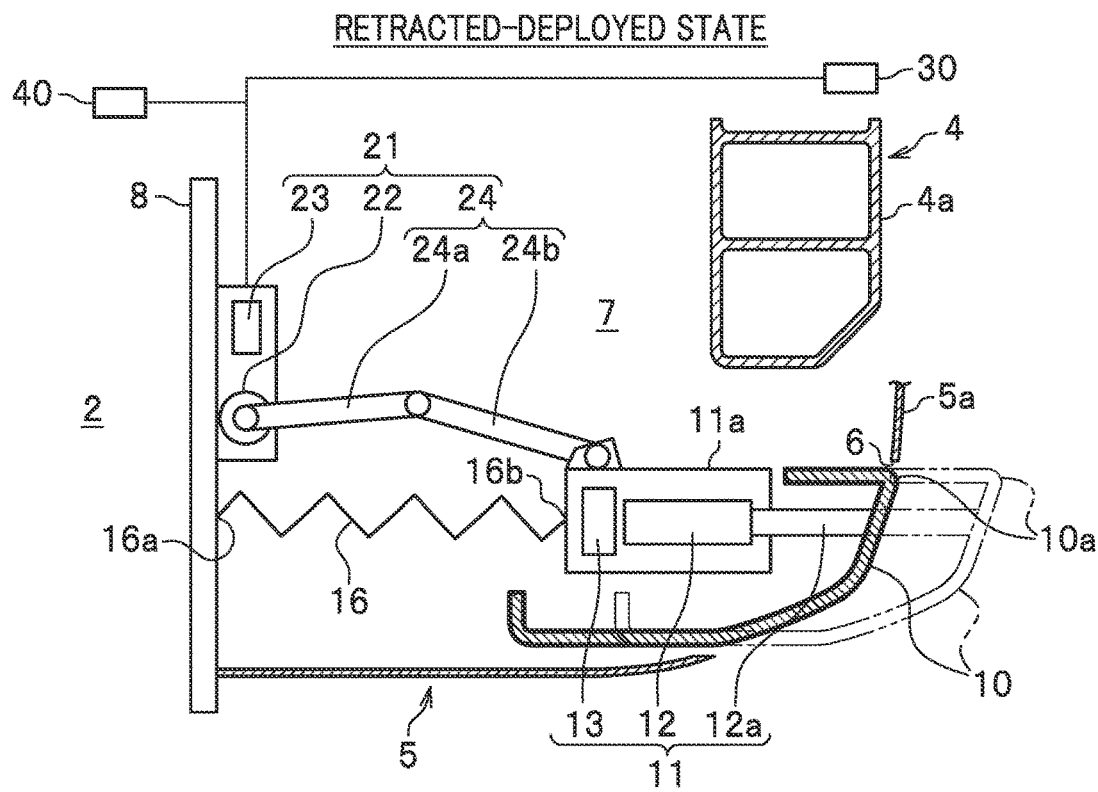
FIG. 7 is a cross-sectional view of a bumper spoiler structure according to a modification of this embodiment, in which a position of the bumper spoiler in the retracted state is illustrated by solid lines and a position of the bumper spoiler in the deployed state is illustrated by two-dot chain lines.

FIG. 7 is a schematic cross-sectional view of a bumper spoiler structure according to a modification of this embodiment, in which the bumper spoiler 10 is in the retracted state or the deployed state. It should be noted that parts same as or equivalent to those described in the above embodiment are denoted by the same reference numerals and description thereof will be omitted.

The bumper spoiler structure according to this modified embodiment includes an elastic member 16 formed in a coil spring shape. The elastic member 16 links (connects) the bumper spoiler 10 and the support member 8 that is arranged frontward of the bumper spoiler 10.

A base end 16a of the elastic member 16 is connected to the support member 8 at the rear portion 2 of the vehicle 1. A distal end 16b of the elastic member 16 is connected to the case 11a of the spoiler drive unit 11. The second controller 23 drives the second actuator 22 to extend the drive arm 24. Accordingly, the case 11a of the spoiler drive unit 11 can be moved in the direction toward the outer side of the vehicle 1 against the tension of the elastic member 16.

At least one of the first actuator 12 and the first controller 13 in the spoiler drive unit 11 may be lost and stop in the deployed state (see the position indicated by the two-dot chain lines in FIG. 7) in which the bumper spoiler 10 protrudes with respect to the bumper panel 5. In this state, there is a risk that the outer end 10a of the bumper spoiler 10, which protrudes toward the outer side of the vehicle 1 beyond the outer end 4a of the bumper beam 4 disposed inside the bumper spoiler 10, comes into contact with an obstacle and the bumper cannot exhibit the desired bumper performance.

In the bumper spoiler structure according to this modified embodiment, if a failure exists in the spoiler drive unit 11, the fail-safe unit 21 stops control of the second actuator 22 and switches to a free state in which drive force for moving the bumper spoiler 10 is not applied to the drive arm 24.

Figure 8:
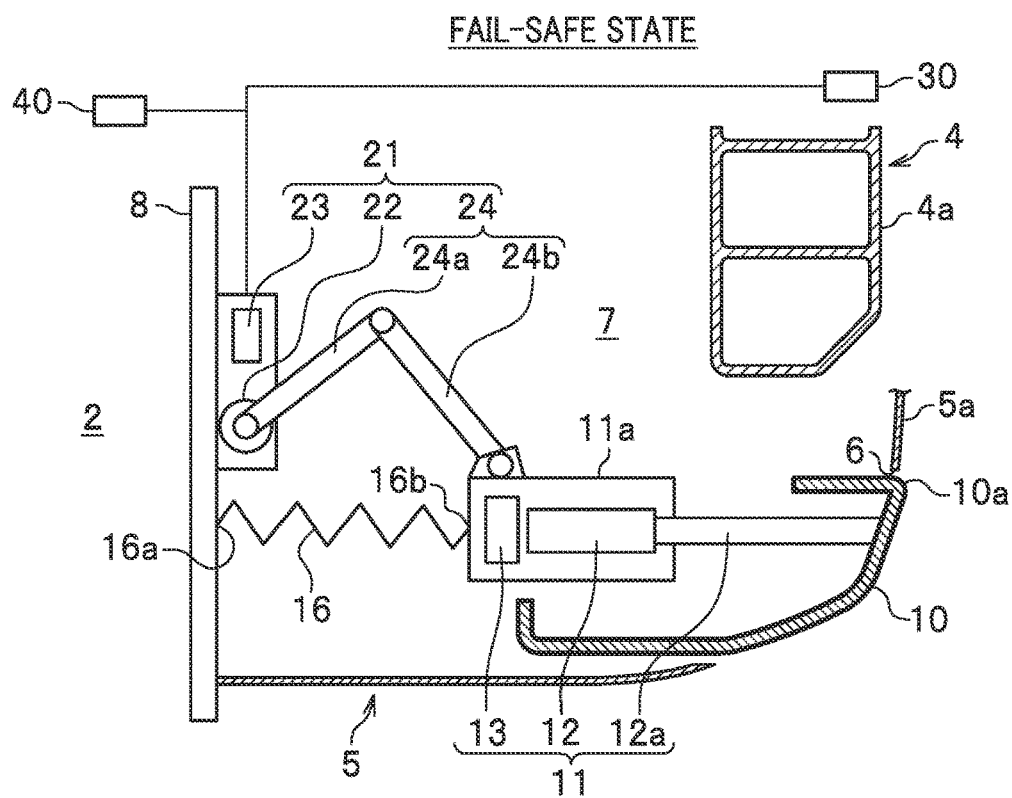
FIG. 8 is a schematic cross-sectional view of the bumper spoiler structure according to the modification of this embodiment explaining a situation where the bumper spoiler is in a fail-safe state.

The bumper spoiler 10 is moved toward the front side of the vehicle 1 by the tension of the elastic member 16 and is retreated into the space 7 shown in FIG. 8, to a position in the retracted state, at which position the outer end 10a of the bumper spoiler 10 is flush with the outer end 4a of the bumper beam 4 or the outer end 10a of the bumper spoiler 10 is located inward in the inside-outside direction of the vehicle with respect to the outer end 4a of the bumper beam 4 (fail-safe state). Accordingly, the rear bumper 3 can exhibit the desired collision performance.

In this modified embodiment, electrical failure may cause the fail-safe unit 21 to stop together with the spoiler drive unit 11. Even in this case, the bumper spoiler 10 is moved toward the front side of the vehicle by the tension of the elastic member 16 and is retreated to the position of the fail-safe state. Accordingly, the rear bumper 3 can exhibit the desired collision performance. Further, even if the spoiler drive unit 11 does not operate, the drive arm 24 of the second actuator 22 can be extended and contracted to resume drive control of the bumper spoiler 10, provided that electric power recovers.

Since other configurations, operations, and effects are the same or equivalent to those of the bumper spoiler structure in the above embodiment, description thereof will be omitted.

As described above, the bumper spoiler structure according to this embodiment includes the bumper panel 5 provided in the rear bumper 3 of the vehicle 1, the bumper spoiler 10 capable of advancing and retreating relative to the bumper panel 5 by being moved in the inside-outside direction of the vehicle 1, the first actuator 12 movable in the inside-outside direction of the vehicle 1 and configured to move the bumper spoiler 10 in the inside-outside direction of the vehicle 1, and the first controller 13 configured to control the first actuator 12.

The bumper spoiler structure further includes the second actuator 22 configured to move the bumper spoiler 10 and the first actuator 12 in the inside-outside direction of the vehicle 1, and the second controller 23 configured to control the second actuator 22.

When at least one of the first actuator 12 and the first controller 13 is lost in the deployed state in which the bumper spoiler 10 protrudes with respect to the bumper panel 5, the second controller 23 moves the bumper spoiler 10 and the first actuator 12 toward the inner side of the vehicle 1 by using the second actuator 22.

According to the bumper spoiler structure of this embodiment configured as described above, the bumper can exhibit the desired collision performance even if a failure or the like occurs in the control mechanism of the bumper spoiler 10.

To be more specific, when the spoiler drive unit 11 performs drive control of the spoiler rod 12a, the bumper spoiler 10 can be moved to the retracted state in which the bumper spoiler 10 is located in the space 7 or to the deployed state in which the bumper spoiler 10 protrudes toward the rear side of the vehicle 1 beyond the outer surface 5a with respect to the bumper panel 5.

In collision of the vehicle 1, if at least one of the first actuator 12 and the first controller 13 is lost and the bumper spoiler 10 remains in the deployed state where the bumper spoiler 10 protrudes from the outer surface 5a of the bumper panel 5, the bumper may be unable to exhibit the desired collision performance set in designing.

The present invention includes the second actuator 22 and the second controller 23 as the fail-safe unit 21.

To be more specific, if a failure exists, the second controller 23 can control the drive of the second actuator 22 to move the bumper spoiler 10 into the space 7 disposed inside the bumper panel 5.

Accordingly, even in a case of loss, the rear bumper 3 can exhibit the desired collision performance.

According to this embodiment, the first actuator 12 and the first controller 13 of the spoiler drive unit 11 are arranged in the space 7, inside the recess-shaped bumper spoiler 10. Accordingly, the second actuator 22 moves, together with the bumper spoiler 10, the case 11a of the spoiler drive unit 11 that is pivotally supported on the distal end portion of the second link member 24b toward the inner side of the vehicle 1. With this configuration, even if the bumper spoiler 10 has been stopped due to loss of one of the first actuator 12 and the first controller 13, it is possible to move the bumper spoiler 10 together with the case 11a of the spoiler drive unit 11 from the outer side to the inner side of the bumper panel 5.

Further, the bumper spoiler structure according to this embodiment includes the elastic member 16 configured to link the bumper spoiler 10 and the support member 8 that is arranged more inward in the inside-outside direction of the vehicle 1 than the bumper spoiler 10.

The second controller 23 drives the second actuator 22 to move the bumper spoiler 10 and the first actuator 12 toward the outer side in the inside-outside direction of the vehicle 1 against reaction force of the elastic member 16.

When at least one of the first actuator 12 and the first controller 13 is lost in the deployed state in which the bumper spoiler 10 and the first actuator 12 have been moved to the outer side in the inside-outside direction of the vehicle 1 and the bumper spoiler 10 protrudes with respect to the bumper panel 5, the second controller 23 stops the drive of the second actuator 22.

The bumper spoiler structure according to this embodiment allows the bumper spoiler 10 to move appropriately by a simple control toward the inner side of the vehicle 1.

To be more specific, if a failure exists in the spoiler drive unit 11, the second controller 23 stops control of the second actuator 22. The bumper spoiler 10 is thereby moved by the elastic force of the elastic member 16.

As described above, the drive control of the second actuator 22 is stopped and the second link member 24b and the first link member 24a of the drive arm 24 are allowed to freely turn (free state). The bumper spoiler 10 is thereby retreated to the position of the retracted state only by the elastic force of the elastic member 16.

The bumper spoiler structure according to this embodiment can perform the fail-safe operation without fail even if an electrical drive mechanism is not employed.

Further, the bumper spoiler 10 can be easily returned to a desired position by causing the second controller 23 to resume the control of the second actuator 22.

For example, as illustrated in FIG. 4, the second controller 23 causes the drive arm 24 of the second actuator 22 to extend against biasing force of the elastic member 16. Accordingly, the bumper spoiler 10 can be easily returned to the desired position.

The bumper spoiler structure according to this embodiment includes the bumper beam 4 extending in the vehicle width direction at the inner side of the bumper panel 5 as illustrated in FIG. 4.

When the second controller 23 moves the bumper spoiler 10 inward in the inside-outside direction of the vehicle 1, the outer end 10a of the bumper spoiler 10 is located more inward in the inside-outside direction than the outer end 4a of the bumper beam 4.

Accordingly, a load applied in collision is appropriately inputted to the bumper beam 4. Thus, the bumper can exhibit the desired collision performance.

Furthermore, the vehicle 1 includes the obstacle sensor 30 configured to detect an obstacle.

The second controller 23 performs control of determining whether to move the bumper spoiler 10 and the first actuator 12 inward in the inside-outside direction of the vehicle 1 based on the information from the obstacle sensor 30.

Accordingly, the bumper spoiler 10 can be moved inward in the inside-outside direction of the vehicle 1 without fail by detecting the risk of collision of the vehicle 1 in advance. This can cause the bumper beam 4 to come into contact with the obstacle first and allows the bumper to exhibit the desired collision performance.

Further, the vehicle 1 includes the vehicle speed sensor 40 configured to detect the vehicle speed of the vehicle 1.

When the vehicle speed is equal to or lower than the predetermined threshold, the second controller 23 moves the bumper spoiler 10 and the first actuator 12 inward in the inside-outside direction of the vehicle 1.

It is therefore possible to prevent the bumper spoiler 10 from moving in a state where the vehicle speed V has not fallen to the threshold. Accordingly, an abrupt change in aerodynamic performance can be prevented during traveling and strangeness felt by the driver can be eliminated.

As described above in the bumper spoiler structure according to this embodiment, a failure may occur in one of the first actuator 12 and the first controller 13 configured to control the first actuator 12, so that the bumper spoiler 10 is possibly set to the deployed state in which the bumper spoiler 10 protrudes from the bumper panel 5 toward the outer side of the vehicle 1.

Even in this case, the bumper spoiler 10 can be moved to a desired position by driving or stopping the fail-safe unit 21. According to the bumper spoiler structure, even if an electrical failure or the like occurs in the control mechanism of the bumper spoiler 10, it is possible to provide a desired collision performance of the bumper spoiler structure by mechanically retreating the bumper spoiler 10 using the elastic member 16.

The present invention is not limited to the aforementioned embodiments and various modifications can be made. The aforementioned embodiments are examples given to describe the present invention in an easily understandable manner, and the present invention is not necessarily limited to embodiments including all of the aforementioned configurations.

Further, a part of the configuration in one embodiment may be replaced with a part of the configuration in another embodiment or added to the configuration in another embodiment. Furthermore, a part of the configuration in each of the embodiments may be deleted, or other configurations may be added to or replace with the configuration in each of the embodiments. Possible modifications on the above embodiment may include, for example, the following modifications.

Although the bumper spoiler structure used for the rear bumper 3 is described as the bumper of the vehicle 1 in this embodiment, the present invention is not limited to this specific bumper. For example, the present invention may be applied to a front bumper or to both of the front bumper and the rear bumper 3 in the vehicle. In other words, the bumper is not limited to have a specific shape and material, and the number of bumpers is not limited.

In the above embodiment, the bumper spoiler 10 is movable in the inside-outside direction through the spoiler opening 6 formed in the rear bumper 3. However, the present invention is not limited to this specific configuration and the bumper spoiler 10 may be movable inward and outward from below the front bumper or the rear bumper.

Further, the direction in which the bumper is moved is not limited to the horizontal direction. For example, the bumper may be moved in the upper-lower direction with predetermined angle. In other words, as long as the bumper spoiler 10 is capable of advancing and retreating relative to the bumper panel 5 by being moved in the inside-outside direction, the position at which the bumper spoiler 10 is advancing and retreating, the advance-retreat ratio and the movement angle of the bumper spoiler 10 are not limited.

What is claimed is:

1. A bumper spoiler structure comprising:
   a bumper panel provided in a bumper of a vehicle;
   a bumper spoiler capable of advancing and retreating relative to the bumper panel by being moved in an inside-outside direction of the vehicle;
   a first actuator movable in the inside-outside direction of the vehicle and configured to move the bumper spoiler in the inside-outside direction of the vehicle;
   a first controller configured to control the first actuator;
   a second actuator configured to move the bumper spoiler and the first actuator in the inside-outside direction of the vehicle; and
   a second controller configured to control the second actuator, wherein
   when at least one of the first actuator and the first controller is lost in a deployed state in which the bumper spoiler protrudes with respect to the bumper panel, the second controller moves the bumper spoiler and the first actuator toward an inner side of the vehicle by using the second actuator.

2. The bumper spoiler structure according to claim 1, further comprising an elastic member configured to link the bumper spoiler and a vehicle member that is arranged more inward of the vehicle than the bumper spoiler, wherein the second controller moves the bumper spoiler and the first actuator toward the outer side of the vehicle against reaction force of the elastic member by driving the second actuator, and when at least one of the first actuator and the first controller is lost in the deployed state in which the bumper spoiler and the first actuator have been moved to the outer side of the vehicle and the bumper spoiler protrudes with respect to the bumper panel, the second controller stops the drive of the second actuator.

3. The bumper spoiler structure according to claim 1, wherein the bumper includes a bumper beam extending in a vehicle width direction at an inner side of the bumper panel, when the second controller moves the bumper spoiler toward the inner side of the vehicle, the second controller causes an outer end of the bumper spoiler to be located more inward of the vehicle than an outer end of the bumper beam or at the same position as the outer end of the bumper beam.

4. The bumper spoiler structure according to claim 1, wherein the vehicle includes an obstacle sensor configured to detect an obstacle, and the second controller performs control of determining whether to move the bumper spoiler and the first actuator toward the inner side of the vehicle based on information from the obstacle sensor.

5. The bumper spoiler structure according to claim 1, wherein the vehicle includes a vehicle speed sensor configured to detect vehicle speed of the vehicle, when the vehicle speed is equal to or lower than a predetermined threshold, the second controller moves the bumper spoiler and the first actuator toward the inner side of the vehicle.

* * * * *